3,591,518
SILICA AQUASOLS AND POWDERS
Donald McMillan, Penarth, Wilmington, Del., assignor to E. I. du Pont de Nemours and Company, Wilmington, Del.
Continuation-in-part of abandoned application Ser. No. 526,230, Feb. 9, 1966. This application Dec. 31, 1968, Ser. No. 788,266
Int. Cl. B01j *13/00;* C01b *33/12*
U.S. Cl. 252—313                                  12 Claims

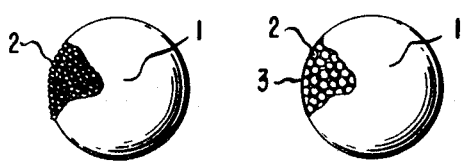
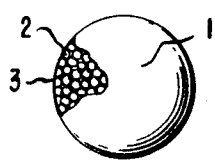
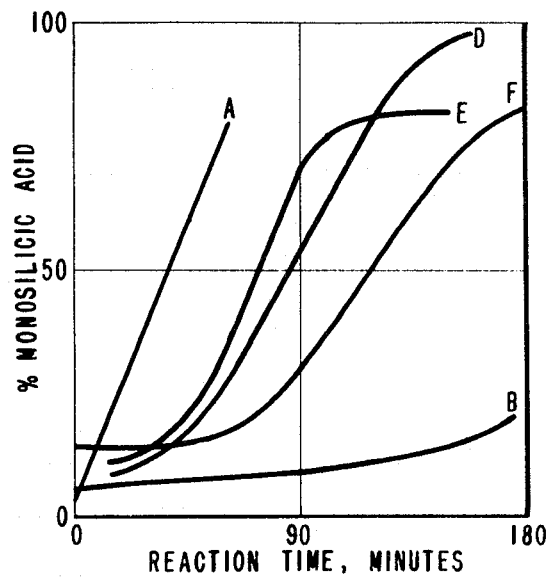
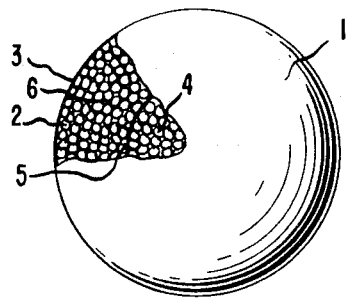
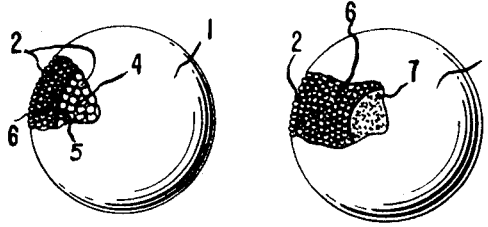
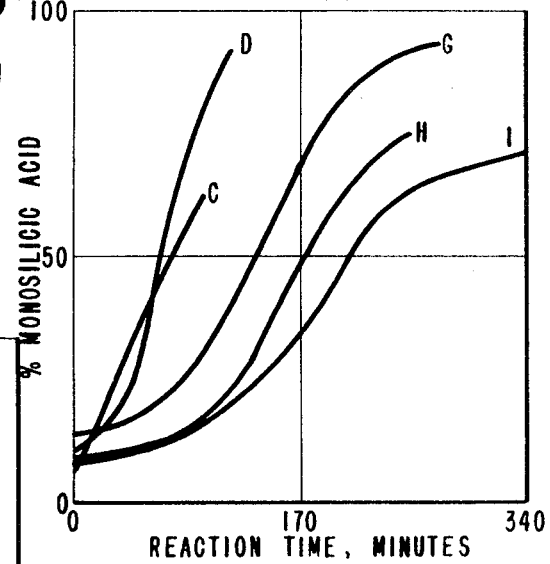
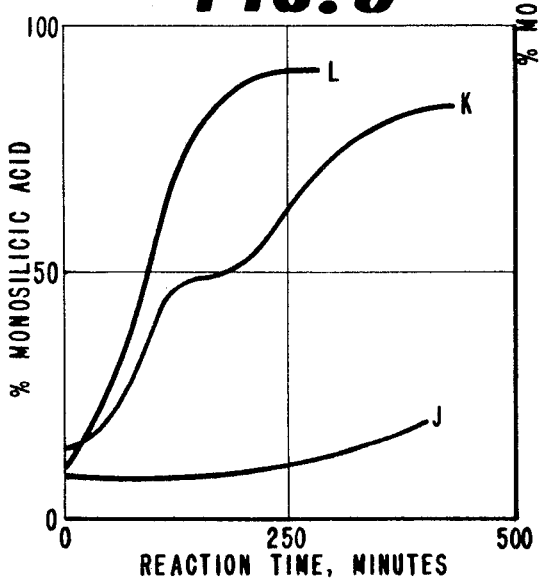
INVENTOR
DONALD McMILLAN United States Patent Office 3,591,518
Patented July 6, 1971

ABSTRACT OF THE DISCLOSURE

Silica aquasols are made by providing a heel of a silica sol containing aqueous ammonium hydroxide in a reaction vessel. Finely divided silicon metal is introduced into the heel and the metal and water react to form silica. The concentration and surface area of the silica in the heel and the production rate of silica in the reaction mixture are such that the silica formed polymerizes on the heel particles to provide novel, spherical silica particles having a surface area average diameter between 150 and 500 m$\mu$.

CROSS-REFERENCE TO RELATED APPLICATIONS

This application is a continuation-in-part of my copending application Ser. No. 526,230, filed Feb. 9, 1966, now abandoned.

BACKGROUND OF THE INVENTION

This invention relates to colloidal silica, and more particularly to silica aquasols and colloidal silica powders and methods for preparing them involving the oxidation of silicon metal in aqueous ammonium hydroxide.

Preparation of silica sols by oxidation of silicon metal in aqueous ammonium hydroxide has been disclosed in Balthis U.S. Pat. 2,614,995 and Montenyohl and Olson U.S. Pat. 2,614,993. Sols made by the general method will be referred to herein as Si+NH$_4$OH sols.

SUMMARY OF THE INVENTION

According to this invention there is provided a process for building up the size of particles in an aqueous silica sol which comprises providing a heel of the sol containing aqueous ammonium hydroxide, introducing finely divided silicon metal into the heel, and permitting the metal and water to react in the presence of the ammonia to form silica, the concentration and surface area of the silica in the heel and the production rate of silica in the reaction mixture being such that the silica formed polymerizes on the heel particles present rather than forming new nuclei. After the reaction the sol can be filtered and concentrated by evaporation of a portion of the water, and further conditioning can be carried out as will be disclosed.

In another aspect, the invention provides novel silica aquasols made up of spherical silica particles having a surface area average diameter $d_s$ between 150 and 500 m$\mu$ and having substantially uniformly distributed porosity. Such sols can be obtained by the build-up process of this invention using a Si+NH$_4$OH sol as a heel. The Si+NH$_4$OH heel sol can be prepared by the methods described in the Balthis patent and the Montenyohl and Olsen patent, referred to above, or it can be prepared by the improved method of making such sols described in my copending application Ser. No. 526,230, filed Feb. 9, 1966, now abandoned. Dry powders obtained by drying these novel sols are also within the scope of the invention.

In a further aspect of the invention, there are provided novel silica aquasols made up of spherical silica particles having a surface area average diameter $d_s$ between 15 and 500 m$\mu$, the particles being composed of a spherical silica core surrounded by a porous silica coating. These novel sols can also be obtained by the build-up process of the invention. The spherical silica core can be either dense silica or porous silica bounded by a layer of relatively dense silica as will be seen from the description which follows. Also included in the scope of the invention are dry powders obtained by drying these sols.

The invention also provides a method for stabilizing the surface characteristics of a sol which has been made by the processes of this invention which have been described above. The method comprises treating the freshly-prepared Si+NH$_4$OH sol with a cation exchange resin and, optionally, thereafter adding a strong acid. Acidified sols obtained by this treatment are also within the scope of the invention; these sols are made up of spherical silica particles having an average surface area diameter $d_s$ in the range of 15–1500 m$\mu$ and having uniformly distributed porosity, and being penetrable by nitrogen molecules. The sols contain sufficient acid to provide a pH in the range of 1 to 4. Dry powders obtained by drying these sols are likewise within the invention.

In accordance with another aspect, the invention is directed to a method for altering the surface characteristics of a Si+NH$_4$OH sol which comprises subjecting a freshly-prepared Si+NH$_4$OH sol to a period of elevated temperature whereby there is formed on the porous sol particles a relatively dense outer layer of silica which is impervious to nitrogen molecules. Sols made by the silicon oxidation processes of this invention are included among the Si+NH$_4$OH sols which can be treated in this manner.

DESCRIPTION OF THE DRAWINGS

FIGS. 1 through 5 are representations partly in section of porous silica particles which can be obtained by the Si-metal oxidation processes of this invention;

FIGS. 6, 7 and 8 show the curves for caustic depolymerization rates of various silica sols, more specifically identified below. In the figures, reaction times in minutes are plotted on the abscissae and percentages of monosilicic acid in solution are plotted on the ordinates.

DETAILED DESCRIPTION OF THE INVENTION

In the description which follows and in the appended claims certain symbols and terms will be used repeatedly. These symbols and terms will now be defined:

$d_s$—surface area average diameter as defined in Balthis U.S. Pat. 2,614,995, col. 7.

$S_c$—external specific surface area in m.$^2$/g. as determined by the equation $$S_c = \frac{6 \times 10^3}{\text{density} \times d_s}$$

For amorphous, anhydrous non-porous silica particles, density is 2.2 grams per cc., so $$S_c = \frac{2720}{d_s}$$

For particles of this invention which have uniformly distributed porosity, the density is about 1.39 grams per cc., so $$S_c = \frac{4320}{d_s}$$

For particles of this invention which have a dense core surrounded by a porous coating the average particle density is between 1.39 and 2.2 grams per cc., so $$S_c = \frac{4320}{d_s} \text{ to } \frac{2720}{d_s}$$

$S_t$—specific surface area in m.$^2$/g. as determined by sodium hydroxide titration. The procedure used is described in detail in an article by George W. Sears, Jr. appearing in Analytical Chemistry, vol. 28, p. 1981, (1956). For dense silica particles $S_t=S_c$ by definition. For porous silica particles as made by the Si+NH$_4$OH route $S_t$ will be greater than $S_c$, as hereinafter discussed.

$A_n$—specific surface area in m.$^2$/g. by nitrogen adsorption. The procedure used is described in an article by F. M. Nelsen and F. T. Eggertsen, in Analytical Chemistry, vol. 30, p. 1387 (1958). For dense silica particles and for porous particles having a relatively dense outer layer which is impervious to nitrogen molecules, $A_n$ will be approximately equal to $S_c$. For porous particles which do not have a dense outer layer, and are thus penetrable by $N_2$ molecules, $A_n$ will be significantly greater than $S_c$, as hereinafter discussed.

Reference is made herein to porous silica particles which have a "relatively dense outer layer." It is known that this outer layer, existence of which is inferred from a value of $A_n$ approximating the value of $S_c$, cannot be completely dense, since the value of $S_t$ is always significantly greater than $S_c$. That is, the outer layer, though impervious to nitrogen molecules, is penetrable by hydroxyl ions [OH$^-$].

Reference is also made herein to "caustic depolymerization rate." This is a measure of the rate at which the particles in a silica aquasol depolymerize to the monomeric form. The procedure for determining the rate is described in detail in the Balthis patent 2,614,995. The depolymerization rate is a function of the surface area available to the alkali solution. Caustic depolymerization rates for Si+NH$_4$OH sols, including those made by the processes of this invention, are approximately the same (after an initial period during which the relatively dense outer layer, if any, is being depolymerized) as the rate for a 2.5–6 m$\mu$ sol having dense particles. This is true regardless of the $S_c$ for the Si+NH$_4$OH sols. From this it is inferrable that the silica particles made by this Si+NH$_4$OH route are porous agglomerates of 2.5–6 m$\mu$ dense ultimate particles.

The build-up process of this invention comprises establishing in a suitable vessel a heel of a silica sol of known particle diameter and surface area, introducing finely divided activated silicon metal and aqua-ammonia, and permitting the silicon and water to react in presence of the ammonia. The reaction vessel is vented to permit escape of the hydrogen produced by the reaction; preferably ammonia is refluxed to the reaction mixture in order to maintain the ammonia content substantially constant. The build-up process not only permits attainment of particle sizes larger than those heretofore obtained by the oxidation of silicon metal, but also permits improved control of particle size and uniformity.

The concentration of silica in the heel and the average diameter of the heel particles must be adjusted so as to provide sufficient surface area so that the silica acid produced by the reaction polymerizes on the heel particles rather than spontaneously forming new nuclei. The permissible concentration of silica in the reaction mixture prior to starting addition of silicon metal can be determined by the following relationship:

$$W = K \cdot \left( \frac{B}{S_c \cdot C} \right) \qquad (I)$$

where W is the silica concentration in the heel in weight percent on an NH$_4$OH-free basis. $S_c$ is the external specific surface area of the colloidal silica particles in the heel sol in square meters per gram, C is the weight in grams of the reaction mixture prior to starting the addition of silicon metal, B is the production rate of SiO$_2$ in the reaction mixture in grams per minute. It has been experimentally determined that the value of the factor K in the equation can range from $1\times10^4$ to $1\times10^9$. The most desirable values of K are between $2\times10^5$ and $6\times10^5$. At K values below the lower limit of $1\times10^4$ it will be found that there is insufficient silica surface area in the reaction mixture to avoid formation of new nuclei. On the other hand, at K value much above the upper limit of $1\times10^9$, the percent conversion of the silicon metal decreases to an extent that would ordinarily make the operation uneconomical.

In general, it is most desirable to not exceed 10 weight percent silica on an ammonium hydroxide-free basis in the reaction mixture at any time during the course of the operation, either in the heel or while carrying out the reaction, in order to achieve a high conversion of the metal to SiO$_2$. However, it is possible to operate at SiO$_2$ concentrations of 20% or higher, if reduced percent conversion of the metal can be economically tolerated. It should be understood however that the upper concentration limit of about 20% is tolerable only where the silica particles in the reaction mixture are relatively large, since sols having very small particles cannot be so concentrated without gelling.

In the plant-scale process which is described in more detail hereinafter, it is contemplated that unreacted silicon metal will be recycled to the reaction vessel. Thus, in most instances when operating on a plant-scale, the advantages to be gained from having a rather high silica concentration in the reaction mixture, such as not having to handle large excesses of water, will more than offset the disadvantage of reduced percent conversion. The minimum silica concentration in the reaction mixture is not critical, except insofar as the surface area requirements set out in formula I above must be met. In general, pratical consideration, such as the cost of handling large excesses of water, will dictate the maintenance of a silica concentration in the reaction mixture of at least 5% and preferably 8 to 9% by weight on a NH$_4$OH-free basis.

Ammonia concentration in the reaction mixture can vary widely from say about 5% to about 35% by weight. The amount is not critical, but higher concentrations will in general result in larger particle size. The ammonia can be added as anhydrous, gaseous ammonia, or it may be added as a water solution, or both depending upon the relative amount of ammonia and water needed to maintain the ammonia and silica concentrations within the ranges set out.

Silicon metal feed rate can vary from $10^{-5}$ to as high as $10^{-3}$ grams per minute for each gram of reaction mixture. As will be apparent from the above discussion, the precise feed rate will depend upon the concentration of silica and the $S_c$ of the silica particles in the reaction mixture, as well as upon the percent conversion desired. A generally preferred range of feed rates is from $3\times10^{-4}$ to $8 \times 10^{-5}$ grams of silicon per minute per gram of reaction mixture.

The build-up process of this invention is ordinarily carried out at temperatures between 15° C. and 90° C., preferably at ambient temperature. Higher temperatures, say up to 200° C. can be used, but there is no advantage in doing so adequate to offset the increased cost of the pressure equipment required. The process can be carried out at temperatures as low as 0° C., but the reaction rate increases with increasing temperature, so it is preferred to use temperatures above 20° C.

The silicon metal used need not have a high degree of purity. A commercial grade of silicon containing trace amounts of calcium, iron, or aluminum as impurities give entirely satisfactory results. For certain purposes it is desirable that the sols made by this route have a very low alkali metal content, say less than 100 p.p.m. on the dry silica basis. For making such sols of course it is desirable that the silicon metal have a correspondingly low alkali metal content.

Silicon metal is available commercially in the form of lumps about 8 mesh in size. In the first stage of the process the metal is milled in a ball mill or similar size reduction equipment to provide particles in the size range of 0.5 to 10 microns, and preferably 1 to 2 microns. The particle size of the silicon metal is significant in that the rate of reaction is much greater with the smaller particles.

Total reaction time of course will depend upon a number of factors including reaction rate and the amount of silica which is to be formed. The volume of the heel particles may constitute 5% or less to 75% or more of the volume of the final particle. Normally the heel particles will comprise about 10 to 15% by volume of the final particles.

As will be discussed more fully below, the heel particles can range in average diameter from 3 or 4 m$\mu$ up to as high as 250 m$\mu$ or larger. Thus, the external specific surface area for the heel sol will ordinarily be between about 17 and 900 M.$^2$/g. The build-up process can be used to produce sols having particles of average diameter anywhere in the range of about 15 to 500 m$\mu$.

In carrying out the build-up process in the laboratory, the commercial lump silicon is ordinarily dry-milled and then washed with aqueous hydrofluoric acid or ammonium bifluoride. The metal is then filtered, washed with water and dried. It is then ready for addition to the reaction vessel. Purpose of the fluoride treatment is to increase the reactivity of the metal. Agitation of the reaction mixture during the reaction is not necessary, but is desirable, since it increases reaction rate.

On plant-scale, the build-up process can conveniently be carried out in a vented ball mill. A heel is established in the mill and the reactants are added to the mill as it rotates. The silicon metal is added in lump form and is subjected to continuous griding as the reaction proceeds. This procedure eliminates any need for the fluoride wash treatment and provides the metal in a highly reactive form.

At the end of the reaction the vessel contains a sol with a concentration of about 1% to about 20%, preferably 5% to 10%, SiO$_2$, and a large excess of ammonia. The sol is then removed from the vessel and filtered. The sol is then concentrated to about 20%, or up to 60% by weight SiO$_2$, depending upon particle size, by atmospheric or vacuum evaporation of a portion of the water. Preferred sols are 5 to 50% SiO$_2$ after concentration. If one desires to make a sol of high N$_2$ surface area the temperature of the sol during concentration should not be allowed to exceed 50° C. and is preferably maintained below 35° C. If a sol with a low N$_2$ surface area is desired, i.e. one having a relatively dense outer layer which is impervious to N$_2$ molecules, concentration can be carried out at higher temperatures under atmospheric or supper-atmospheric pressure. After the evaporation step, the sol will contain about 0.2–0.5% ammonia and will have a pH of about 9–10. In plant scale operation the aqua-ammonia removed in the evaporation step is recycled to the reactor.

After the sol is concentrated it is again filtered and is ready for shipment or use.

As noted above, an advantage of the silicon oxidation route for making silica sols is that it permits manufacture of sols having a very low alkali metal content of, say, less than 100 parts per million parts of silica. Where a sol having such a low alkali metal content is the objective of the build-up process of this invention, double deionized or distilled water should be used in order to avoid contamination. It is notable that although the commercial grade silicon metal contains as much as 1.0% Fe, the sols produced by the build-up process of this invention contain only 30 to 40 p.p.m. on the dry SiO$_2$ basis.

As previously stated, the sols made by the Si+NH$_4$OH route are porous. When freshly prepared the particles are penetrable by nitrogen molecules. Upon aging the surface of the particles changes. When measured several days after preparation the A$_n$ of the particles is significantly less than the A$_n$ measured shortly after preparation. This effect is due apparently to the formation of a relatively dense outer layer or "skin" which is impervious to nitrogen molecules.

This effect of aging on Si+NH$_4$OH sols can be inhibited by treating the sol while fresh with a cation exchange resin to reduce the pH to within the range of 3 to 4. Following this treatment the sol can be further stabilized, if desired, by addition of acid to a pH in the range of 1 to 4.

The cation exchange resin used in this treatment can be, for example, the hydrogen ion form of a strong acid resin of the sulfonated styrene-divinyl benzene type such as Dowex-50, supplied by the Dow Chemical Co., or the equivalent. Any strong acid can be used for the pH adjustment. Examples which are preferred because of cost include hydrochloric, sulfuric, nitric, formic, and acetic acids.

For some applications of course it may be desirable to have sols made up of porous particles having this relatively dense outer layer or "skin." It has been found that such sols can be obtained by subjecting a freshly made Si+NH$_4$OH sol to a heat treatment.

Ordinarily, the heat treatment will consist of raising the temperature of the sol to about 95° C. and maintaining this temperature for a period of about 3 hours at a pH of 9 to 10.5. However, the temperature may range from about 50° C. up to 200° C. or higher, pH range from 8 to 11, and the time may range from ½ hour or less up to 6 hours or more. In general, the time required will decrease with increasing temperature.

Any sol made by the Si+NH$_4$OH route, including sols made by the novel processes described herein can be heat-treated to alter its surface characteristics or deionized (or deionized and acid-treated) to stabilize its surface characteristics in accordance with the methods described. Si+NH$_4$OH sols which have been treated as described to stabilize their surface characteristics will be hereinafter referred to as "stabilized sols."

The effect of aging or heat treatment on the caustic depolymerization rate of a sol made by the improved Si+NH$_4$OH method of this invention can be seen by comparing curves D, G, H, and I of FIG. 7. Curve D is for a freshly-made 16 m$\mu$ sol prepared as described in Example 4 below. Curves G and H are for the same sol aged for periods of 28 days and 40 days, respectively. Curve I is for the same sol heat-treated at 95° C. for 6 hours. It will be observed that the aged and heat-treated sols depolymerize at a much slower rate than the fresh sol, primarily due to the time required to depolymerize the relatively dense outer layer.

Curve C of FIG. 7 shows the depolymerization rate for a 6 m$\mu$ sol made up of dense silica particles prepared by the method of U.S. Pat. 2,750,345. Comparing Curve C with Curves G, H, and I, it will be observed that, after the initial delay, the depolymerization rate for an aged or heat-treated sol of the Si+NH$_4$OH type is about the same as the rate for a 6 m$\mu$ sol having dense particles.

Curve D of FIG. 6 is based on the same data as Curve D in FIG. 7. Curve A in FIG. 6 shows the depolymerization rate for a 4 m$\mu$ $d_s$ sol having dense particles made by the method of U.S. Pat. 2,750,345. Comparing Curves A and D, it will be seen that the rate for a freshly-made Si+NH$_4$OH sol is about the same as the rate for the 4 m$\mu$ sol.

Curve B in FIG. 6 shows the rate of depolymerization of a 12 m$\mu$ $d_s$ sol with dense particles made by the method of U.S. 3,012,927.

Curve F of FIG. 6 shows the depolymerization rate for a 49 m$\mu$ $d_s$ deionized sol made by the improved Si+NH$_4$OH process of my copending application, Ser. No. 526,230, filed Feb. 9, 1966, now abandoned. Details of preparation are given in Example 3 of that application. It will be observed that the depolymerization rate for this sol, after a slight initial delay is about the same as the rates for the 4 m$\mu$ Si+NH$_4$OH sol (Curve A). Thus it is seen that the rate for a Si+NH$_4$OH sol is essentially independent of gross particle size.

From the above caustic depolymerization data, it can be inferred that a freshly made or stabilized Si+NH$_4$OH sol is made up of porous particles which are agglomerates of dense ultimate particles of about 4 m$\mu$ size. Aging or heat-treatment of the sol apparently results not only in formation of a relatively dense "skin" on the particle surfaces, but also in a rearrangement of the internal structure which decreases the caustic depolymerization rate. Electronmicroscope inspection of a microtome section of the sol particles indicates that this internal rearrangement consists at least in part of growth of the ultimate particles.

The build-up process of this invention can be used to provide sols with particle size anywhere in the range 15 m$\mu$ to 500 m$\mu$ $d_s$. The sols as produced have in general a high degree of particle size uniformity. For example, it is possible, using the build-up process of this invention, to produce a sol with 200 m$\mu$ $d_s$ particles in which 95% of the particle diameters lie within the range of 175 m$\mu$ to 225 m$\mu$.

When a freshly-made or stabilized sol of the Si+NH$_4$OH type is used as a heel in the build-up process, the resulting sol particles will be characterized by substantially uniformly distributed porosity. Such sols having particles in the size range 150 m$\mu$ to 500 m$\mu$ $d_s$ are novel and are within the scope of the invention. For a sol of this type, the ratio of $S_t$ to $S_c$ will in general be greater than $1+0.1$ ($d_s-5$). For a freshly made or stabilized sol of this type, the ratio of $A_n$ to $S_t$ will in general be between $0.4+1.7$ $1/d_s-5$ and 1. A particle of a sol of this type is represented in FIG. 1. The numeral 1 indicates the porous particle generally, and the numeral 2 indicates the dense ultimate particles of which the larger particles are believed to consist. Preparation of a sol of the type shown in FIG. 1 is illustrated in Example 2. For an aged or heat-treated sol of the type under discussion, the ratio of $A_n$ to $S_c$ will be nearer unity and the ratio of $S_t$ to $A_n$ will in general be greater than $1+0.08$ ($d_s-5$), due to the relatively dense outer layer or "skin" of silica. A particle of this type is shown in FIG. 2. The numeral 1 again indicates the particle generally; the numeral 2 represents the dense ultimates, and the numeral 3 indicates the relatively dense outer layer. It will be observed that the ultimate particles are shown in FIG. 2 as being larger than the ultimate particles in FIG. 1. This is consistent with the observation that caustic depolymerization rates for heat treated or aged sols are approximately equal to the rate for 6 m$\mu$ sols with dense particles whereas the rates for fresh or stabilized sols are approximately equal to the rate for a 4 m$\mu$ sol with dense particles. It is also consistent with the appearance of electron micrographs of microtome sections of the particles.

When an aged or heat-treated Si+NH$_4$OH sol is used as the heel, the build-up process results in sols in which the particles have a spherical porous silica core bounded by a relatively dense outer layer and a porous silica coating. Such sols are novel and are within the scope of the invention. Particles in these sols can range in $d_s$ from 15 m$\mu$ up to as high as 500 m$\mu$. For these sols, the ratio $S_t/S_c$ will in general be greater than $1+0.1$ ($d_s-5$). For a freshly made or stabilized sol of this type the ratio of $A_n$ to $S_t$ will generally be between $$0.4+1.7\left(\frac{1}{d_s-5}\right)$$

and 1 when the volume of the porous coating is at least equal to the volume of the core. A particle of this type is represented in FIG. 3; the numeral 1 indicates the particle generally, 4 indicates the spherical core, 5 designates the relatively dense silica layer which bounds the core, 6 designates the porous silica coating, and 2 designates the ultimate particles. Preparation of a sol of this type is illustrated in Example 5 below. The caustic depolymerization rate for the sol of Example 5 is shown in FIG. 8, Curve K. It will be observed that the initial depolymerization rate for this sol is approximately equal to the rate for a 4 m$\mu$ dense sol due to depolymerization of the coating. A sharp decrease in rate occurs when the relatively dense layer on the core particle is reached, then, when this layer is completely depolymerized, the rate increases to a value approximately equal to the rate for a 6 m$\mu$ dense sol, indicating that the ultimate particles in the core are larger than those in the coating. A further illustration of preparation of a sol of this type is shown in Example 1-D. The particles of the latter sol, however, are larger than those in the sol of Example 5 and the ratio of volume of coating to volume of core is greater. The depolymerization rate for the sol of Example 1-D is shown in Curve E of FIG. 6.

An aged or heat-treated sol of this type will have a relatively dense silica outer layer on the porous coating, and will ordinarily exhibit a ratio $S_t$ to $A_n$ greater than $1+0.08$ ($d_s-5$). FIG. 4 represents a particle of a sol of this type, and Example 1-C below illustrates preparation of such a sol. In FIG. 4, the numeral 1 indicates the particle generally, 4 indicates the spherical porous core, 5 indicates the relatively dense outer layer on the core, 6 indicates generally the porous coating surrounding the core, 3 indicates the relatively dense layer on the coating, and 2 indicates the dense ultimate particles. Caustic depolymerization rate for the sol of Example 1-C is shown in Curve J of FIG. 8. The rate is low because of the time required to depolymerize the outer coating of silica. If the abscissa were extended it would be seen that the slope of the curve eventually increases until it approximates that for a 6 m$\mu$ dense sol.

The heel sol used in the build-up process of this invention need not be a sol of the Si+NH$_4$OH type. Instead, it may be a sol made by conventional prior art processes in which the particles are dense, i.e. non-porous. In this case the sol particles resulting from the build-up process will consist of a dense spherical silica core surrounded by a porous silica coating. Sols of this type in which the particles range from 15 m$\mu$ to 500 m$\mu$ are novel and within the scope of the invention.

Since the outer coating in sols of this type is porous, the particles will in general exhibit a ratio of $S_t/S_c$ greater than $1+0.1$ ($d_s-5$) when the volume of the coating is at least equal to the volume of the core. The porous coating may of course be either pervious or impervious to nitrogen molecules, depending upon treatment of the sol after completion of the build-up operation. FIG. 5 represents a particle of a freshly made or acid-stabilized sol which does not have a dense outer layer and is thus pervious to nitrogen molecules: 1 indicates the particle generally; 7 indicates the dense silica core; 6 indicates generally the porous coating; and 2 indicates the ultimate, dense particles which are believed to make up the porous coating. A sol of this type will generally exhibit a ratio $S_t/S_c$ greater than $1+0.1$ ($d_s-5$) when the volume of the coating is at least equal to the volume of the core and will also generally exhibit a ratio $A_n/S_t$ between $$0.4+1.7\left(\frac{1}{d_s-5}\right)$$

and 1. Preparation of such a sol is illustrated in Example 6 below. Curve L of FIG. 8 shows the depolymerization rate for the sol of Example 6. The porous coating in an aged or heat-treated sol of this type will have a dense outer "skin" of silica and will thus ordinarily exhibit a ratio of $S_t/A_n$ greater than $1+0.08$ ($d_s-5$) when the volume of the coating is at least equal to the volume of the core. Since, however, the outer skin is penetrable by hydroxyl ions, the ratio $S_t/S_c$ will remain high, ordinarily above $1+0.1$ ($d_s-5$) when the volume of the coating is at least equal to the volume of the core.

For instruction on the preparation of silica sols made up of dense particles which are suitable as heel sols in the build-up process of this invention, reference is made to the following U.S. Pats.: Bird, 2,244,325; Bechtold and Snyder, 2,574,902; Voorhees, 2,457,971; Rule, 2,577,485; Alexander, 2,750,345; Dirnberger, 2,974,109; and Rule, 3,012,972.

As previously stated a significant advantage of the Si+NH$_4$OH route is that it permits manufacture of sols having a very low alkali metal content. This is very important for some applications, as where the sol is to be used to prepare a catalyst support, since sodium has a deleterious effect upon catalytic activity in a number of uses. Thus, in preferred embodiments the novel sols of this invention will have alkali metal contents of less than 100 p.p.m., even more preferably less than 50 p.p.m., of sodium or other alkali metal content based on the weight of the dry silica. Of course, the sols made up of dense silica particles prepared by the processes of the prior art patents referred to immediately above all have substantial alkali metal contents and thus cannot be used where an alkali-metal-free sol is desired.

In analyzing for sodium content of a silica sol, the procedure used is as follows:

A sample of silica sol estimated to contain between 100–150 micrograms of sodium is weighed into a platinum dish. A measured amount of concentrated H$_2$SO$_4$ in the range of 1–3 ml. and a measured amount (about 25 ml.) of 48% HF are added to the sample. A reagent blank is prepared using the same amounts of H$_2$SO$_4$ and 48% HF.

The sample and blank are then placed on a steam bath and heated to evolve the SiF$_4$ from the sample.

The sample and blank are then heated on a laboratory burner to fume off H$_2$SO$_4$. Heating is continued until about 1 ml. of H$_2$SO$_4$ remains.

The residue from the sample and blank are then washed from the dish into 100 ml. of volumetric flasks. The flasks are then filled to the mark with deionized water.

The sample and blank are then compared with a series of standards by atomic absorption spectroscopy.

The novel sols which have been described above can all be dried to provide silica powders. These powders will be made up of particles having the same characteristics as described for the sol particles. Such powders are also novel and are included in the scope of the invention. The particles in the dry powders are generally surprisingly free from aggregation and are thus redispersible in water. So far as applicant is aware, this is the first time that it has been possible to obtain a redispersible powder from a silica sol made up of particles in the range of 100 m$\mu$ to 500 m$\mu$ $d_s$.

In preparing the powders any conventional method of drying can be used. Thus drying can be accomplished by direct application of heat and/or vacuum to evaporate the water. Alternatively, spray-drying, drum-drying or any other conventional drying method can be used. In order to prevent a change in $A_n$ and agglomeration during drying the sol pH should be decreased below 4 prior to drying, preferably with a cation exchange resin in the acid form.

It should be observed that it is possible to obtain very useful information on the nature of the particles of sols of this invention by electron microscope examination of microtome sections of the sol particles. In preparing a microtome section, the procedure is to treat the sol with a cation exchange resin, e.g. Dowex-50, dry it in an oven, then disperse the particles in an epoxy resin. A section is then taken through the resin aggregate with a diamond knife, and an electromicrograph (EMG) of the section is made. An EMG of a typical particle at 50,000× or greater will resemble a grape cluster viewed from a distance and further supports the conclusion that the particles are porous agglomerates of smaller dense ultimate particles. The representations of the silica particles in FIGS. 1–5 of the drawings were based in part upon the appearance of EMG's of microtome sections. This method of analysis is useful only for sols made up of particles of $d_s$ 50 m$\mu$ or larger. The structure of smaller particles is inferred from the observed structure of the larger particles and from the other evidence based on surface area and caustic depolymerization rate measurements.

Silica sols of this invention can be used for a variety of purposes which are already familiar to those skilled in the art. They can be used for treating textiles such as rayon, cotton and wool to make them soil resistant. They can be used for treating paper in order to increase its stiffness or to increase the contrast of photocopying papers. Slip resistance of floor waxes can be enhanced by incorporation of the sols of this invention. Drying of the sols, especially those made up of particles above 150 m$\mu$ in average diameter and having very low alkali metal content provides powders which are particularly suitable for molding under pressure and sintering at high temperature to provide high-strength amorphous silica bodies. Other methods of using the sols have been discussed above and still others will be apparent to those skilled in the art.

The invention will now be further described with illustrative examples.

EXAMPLE 1

Preparation of silicon metal 207 grams of silicon metal, 8 mesh and below in particle size, are placed in a rubber-lined steel 1-quart ball mill containing ¼ inch steel balls. The analysis of this silicon metal is 99.03% Si, 0.02% Ca, 0.27% Al, and 0.28% Fe. The above ball mill is rotated at approximately 100 r.p.m. for 16 hours. The fine fraction is then separated from the balance of the metal and balls by screening through a 40 mesh screen. 186 grams of through 40 mesh material is produced. The average particle size of the through 40 mesh fraction is approximately 1–5 microns. The 186 grams of thorugh 40 mesh silicon metal is activated by slowly adding to an agitated solution containing 2100 milliliters of distilled water and 300 milliliters of 48% reagent grade aqueous hydrofluoric acid. When all the silicon metal has been added to the agitated mixture and gas evolution has essentially stopped, the slurry is filtered on a vacuum filter. The filter cake is then washed with distilled water until the filtrate pH is between 4 and 5. The final traces of water are removed from the filter cake by displacement with acetone. The cake is then air dried for a short period and stored in a tight container to prevent reoxidation of the active surface. Deactivation of this silicon metal is also avoided by minimization of time between this preparation step and the time when feed to the reaction step is started.

Prepartion of heel

The silica sol selected for use as a heel in this batch is one produced by the improved silicon oxidation process of my copending application Ser. No. 526,230, filed Feb. 9, 1966, now abandoned. Detailed procedure is set out in Example 7 of that application. This sol contains 17.8% SiO$_2$ and has a surface area average diameter ($d_s$) of the particles equal to 97.8 millimicrons. The sol has been aged at room temperature at a pH of 9.4 for 42 days prior to its use in this batch. 197 grams of this sol is placed in a 12-liter flask equipped with an agitator and a Dry Ice, acetone-cooled reflux condenser. The vent from this reflux condenser is metered and thence conducted to a safe place for disposal of the hydrogen produced. To this silica sol 1550 grams of reagent grade aqueous ammonum hydroxide, containing about 27% NH$_3$, is added. This heel is then cooled to 12° C. by circulating water in a cooling bath around the reactor and 68 grams of anhydrous ammonia are slowly added. The reaction flask is then purged with nitrogen to remove oxygen and thus avoid the formation of an explosive mixture with the subsequently produced hydrogen.

Reaction step

The above heel is then heated to 22° C. by passing warm water through the reactor cooling bath and the addition of silicon metal is started. Silicon metal is added by momentarily opening a port in the reaction vessel and adding a small increment of feed every 5 minutes. These increments of feed are equally measured in order to approximate the constant rate addition of the activated silicon metal over a 4-hour period. One-half hour after starting the addition of silicon metal, the addition of 1240 grams of ammonium hydroxide is started at a constant rate so that this material will be added over a 3.5-hour period.

The temperature of the reaction mixture is maintained between 27° and 29° C. by external cooling and the ammonia concentration of the reaction mixture is maintained essentially constant by returning the reflux condensed in the Dry Ice-acetone condenser. During the 4-hour reaction period the hydrogen evolution rate varies between 1.0 liters per minute and 1.36 liters per minute. The addition of silicon metal and a reagent grade ammonium hydroxide is concluded 4 hours after the start of the first Si metal addition. Agitation of the reaction mixture is continued for 50 minutes after the last silicon metal addition, at which time the evolution of hydrogen has essentially stopped. The reaction mixture is then filtered through Whatman No. 54 paper to remove unreacted silicon metal and impurities which are insoluble in the reaction mixture.

Concentration

Two liters of the above reaction mixture is then placed in a 3-liter flask equipped with an agitator, a condenser cooled with water at 4° C., a large condensate receiver, and a source of vacuum. The concentration flask is heated with a warm water bath. Concentration is carried out at autogenous pressure and the temperature of the boiling silica sol is maintained between 26° C. and 30° C. Concentration is carried out at constant volume by feeding the balance of the reaction mixture at the same rate that the vapors are withdrawn from the concentration vessel. When all the reaction mixture has been fed to the concentrator, 750 grams of distilled water are then fed while continuing to remove vapor and maintain constant volume in order to remove additional ammonia from the silica sol. After completing the water feed the sol is then boiled down to approximately 1500 milliliters, thus completing the concentration step. The silica sol is then vacuum filtered through Whatman No. 5 paper.

Yield

This batch produces 1605 grams of silica sol with a specific gravity of 1.105 measured at 25° C. which is equivalent to 17.4% $SiO_2$.

Analysis

The silica sol has a pH of 9.4 measured at 25° C. and the total alkalinity of the sol calculated as percent $NH_3$ is 0.31%. The sol is examined under the electron microspoce and the surface area average diameter ($d_s$) of the particles is determined by the technique described in Balthis U.S. Pat. 2,614,995. $d_s$ is equal to 207.4 millimicrons and the particle size uniformity of the sol is very good as indicated by the fact that 95% of the particles examined in the electron micrograph are between 175 millimicrons, and 240 millimicrons in diameter.

The surface area by sodium hydroxide titration ($S_t$) of this sol is determined by the method described in an article by George W. Sears, Jr. appearing in Analytical Chemistry, vol. 28, pages 1981–1983, December 1956. $S_t$ is 794 m.$^2$/g.

A small portion of the above silica sol is diluted to between 5 and 10% $SiO_2$ and then deionized by the addition of acid form of "Dowex" 50 ion exchange resin to a final pH of 3.3. The resin is then filtered off and this dilute deionized sol dried in an air-circulating oven for about 20 hours at a temperature of 100° C. The surface area by nitrogen adsorption ($A_n$) is then determined on this dry powder by the dynamic method described in the following reference (Nelsen, F. M. and Eggertsen, F. T., Analytical Chemistry, 1958, vol. 30, p. 1387). $A_n$ is found to be 370 m.$^2$/g. of dry powder.

Sol treatment and aging

This silica sol is divided into 4 equal portions. Portion A is aged as is. Portion B is deionized with the acid form of "Dowex" 50 resin to a pH of 3.25 and the resin separated by filtration. The sol is further lowered in pH by the addition of 1.1 milliliters of 20% nitric acid. The pH of this acid treated sol is 1.35 measured at 25° C. A small portion of this sol is dried directly in an air-circulating oven for about 20 hours at 100° C. and the surface area by nitrogen adsorption is determined by the method described above. $A_n$ is equal to 367 m.$^2$/g. The surface area by caustic titration ($S_t$) of this sol was determined by the method described above. $S_t$ is 745 m.$^2$/g.

Portion C of the original sol is placed in an agitated 3-neck flask equipped with a reflux condenser and heated on a steam bath. This sol is maintained at 90° C. for a period of 3 hours and then cooled to room temperature. The resulting heat treated sol has a pH of 9.8 measured at 25° C. and a specific gravity of 1.105 at 25° C. A small portion of this heat treated sol is deionized and dried in the manner described under "Analysis" above and the surface area by nitrogen adsorption is 22 m.$^2$/g. The surface area by caustic titration of the sol is 604 m.$^2$/g.

Portion D of the original sol is treated with the acid form of "Dowex" 50 resin until the sol pH is decreased to 3.25 and the resin is separated by filtration. A small portion of this stabilized sol is dried in the manner described under "Analysis" above and the surface area by nitrogen adsorption is 370 m.$^2$/g. The surface area by caustic titration of this sol is 707 m.$^2$/g.

Samples of each of the four sols described above are examined under the electron microscope and microtome sections of each of the dry powders are prepared in accordance with the procedure described in the body of this application. These microtome sections are photographed with the aid of the electron microscope.

The above silica sols are all stored at room temperature in tightly sealed polyethylene containers. After aging 15 days the following results are obtained: Portion B has a nitrogen surface area of 372 m.$^2$/g.; Portion C, a nitrogen surface area of 23 m.$^2$/g.; and Portion D, $A_n$ is 356 m.$^2$/g. The sols are examined under the electron microscope as well as making microtome sections of the dry powders for examination under the electron microscope.

After aging an additional 15 days the following results are obtained: Portion A, $A_n$ equals 50 m.$^2$/g.; Portion B, $A_n$ equals 410 m.$^2$/g.; Portion C, $A_n$ equals 26 m.$^2$/g.; Portion D, $A_n$ equals 395 m.$^2$/g. Again, the sols are examined under the electron microscope and microtome sections of the dry powders also examined under the electron microscope.

In addition, the caustic depolymerization rates of Sols C and D after aging 30 days are determined by the methods described in Balthis U.S. Pat. 2,614,995 and the results are shown in FIG. 8, Curve J, and FIG. 6 Curve E, respectively.

After aging an additional 33 days the following results are obtained: Portion A, $S_t$ equals 646 m.$^2$/g.; Portion B, $S_t$ equals 736 m.$^2$/g.; Portion C, $S_t$ 530 m.$^2$/g.; and Portion D, $S_t$ equals 675 m.$^2$/g.

EXAMPLE 2

Preparation of silicon metal

The analysis of the silicon metal used in this run is 99.03% Si, 0.027 Ca, 0.27% Al, and 0.28% Fe, 160 g. of the through 40 mesh fraction of this Si metal ball milled in a manner similar to that described in Example 1 is combined with 35 g. of the same purity metal which has been ground in a previous batch. The 195 g. of through 40 mesh silicon metal is activated by adding to 2100 ml. of distilled water in an agitated, corrosion-resistant vessel and then slowly adding 300 ml. of 48% reagent grade aqueous hydrofluoric acid. When the gas evolution has essentially stopped from the activated slurry, it is filtered, washed, and stored in the manner described in Example 1.

Preparation of heel

The silica sol selected for use as a heel in this batch is the deionized sol produced in Example 3 of my copending application, Ser. No. 526,230, filed Feb. 9, 1966, now abandoned. 215 g. of this freshly prepared deionized sol is placed in a 12 l. flask equipped with an agitator and a Dry Ice-acetone-cooled reflux condenser. This reactor is vented and purged in the same manner as described in Example 1. 1760 ml. of reagent grade aqueous ammonium hydroxide is added to the reactor and the heel is cooled to 10° C. by circulating cooling water through the bath from the reactor. 77 g. of anhydrous ammonia is slowly added.

Reaction step

The reaction is carried out in a manner described in Example 1 except that the heel is preheated to 25° C. before starting the addition of silicon metal. Also, the ammonia hydroxide added for dilution in this batch is 7,280 ml. The temperature during the reaction period is maintained between 25° C. and 30° C. and the hydrogen evolution rate varies between 1.0 l./min. and 1.1 l./min.

Concentration

The constant volume evaporation is carried out in a manner similar to that described in Example 1 with the temperature of the boiling silica sol being maintained between 19° C. and 32° C. After all the reaction mixture has been fed to the concentrator, no additional distilled water is fed and the sol is boiled down to 1700 ml. The concentrated silica sol is vacuum filtered through Whatman No. 42 paper. This yields 1,772 g. of sol containing 18% $SiO_2$.

Analysis pH 9.1 at 25° C. Total alkalinity as percent $NH_3$ 0.38%. $A_n$ 377 m.²/g. $S_t$ 917 m.²/g. $d_s$ 97.3 m$\mu$.

EXAMPLE 3

Preparation of silicon metal

The analysis of the silicon metal used in this batch is 98.9% Si, 0.34% Fe, 0.08% Ca, and 0.28% Al.

195 g. of this silicon metal which has been ground in a manner described in Example 1 is activated as described in Example 2.

Preparation of heel

The silica sol used in the preparation of the heel for this batch contains 18.3% $SiO_2$ and has a surface area average diameter ($d_s$) of about 8 m$\mu$. The sol has been aged at room temperature at a pH of 9.6 for 40 days prior to use in this batch. 40.4 g. of this sol is placed in the reactor described in the examples above and 6,140 ml. of reagent grade aqueous ammonium hydroxide is added.

Reaction step

The reaction step is carried out as described in Example 1 above with no ammonium hydroxide added for dilution. The reaction temperature varies between 19° C. and 29° C. Prior to filtration of the reaction mixture, a small sample is withdrawn and after filtration the total alkalinity as percent $NH_3$ is determined to be 25.8% $NH_3$. Also, a small portion is withdrawn and carefully filtered and the particle size $d_s$ is determined by use of the electron microscope. $d_s$ prior to concentration is 48.7 m$\mu$.

Concentration

This batch is concentrated to approximately 1700 ml. in the same manner as described in the examples above. The resulting silica sol contains 13.5% $SiO_2$ and has a total weight of 1884 g.

Analysis pH 9.35 at 25° C. Total alkalinity as percent $NH_3$ 0.22%. Viscosity at 25° C. 1.77 cps. $A_n$ 336 m.²/g., $d_s$ 50.0 m$\mu$. Total sodium 10 p.p.m., total Fe 4.2 p.p.m., and total Ca 2.4 p.p.m.

EXAMPLE 4

Preparation of silicon metal 207 g. of silicon metal, 8 mesh and below in particle size are placed in the ball mill described in Example 1. The analysis of this silicon metal is 97.51% Si, 1.01% Fe, 0.05% Ca, and 0.44% Al. This metal is ball milled for 20 hours in the manner described in Example 1 and the fine fractions separated by screening through a 40 mesh screen. 187 g. of through 40 mesh material is produced.

Reaction step 5600 ml. of distilled water and 3100 ml. of aqueous reagent ammonium hydroxide is added to the reaction vessel described in the examples above. The above ammonium hydroxide containing about 9% $NH_3$ is preheated to 27° C. before starting the addition of silicon metal. The reaction step is then carried out as in Example 3 above. The reaction temperature is maintained between 27 and 29° C. The reaction mixture is then filtered to remove unreacted materials.

Concentration

The concentration of this silica sol is carried out as described in Example 2 with the temperature of the boiling silica sol varying between 23° C. and 28° C. The sol is concentrated to approximately 790 ml. This yields 940 g. of sol with a specific gravity of 1.211 at 25° C. which is equivalent to 31.1% $SiO_2$. This concentrated sol is filtered through "Solka-floc" supported on Whatman No. 54 filter paper. Some dilution is experienced in filtration and the resulting sol has a $SiO_2$ concentration of 17.4%.

Analysis $A_n$, 349 m.²/g. $S_t$, 787 m.²/g. $d_s$, 16.1 m$\mu$.

Sol treatment and aging

This sol is divided into two portions. Portion A is aged as is. Portion B is placed in a 1-liter, 3-neck flask equipped with an agitator and reflux condenser and placed on a steam bath. This sol is heated for 6 hours at a temperature between 91° and 95° C. and then cooled to room temperature. The surface area by nitrogen adsoprtion ($A_n$) of this heat treated sol is 276 m.²/g. $S_t$ is 490 m.²/g. pH is 9.4 at 25° C. The caustic depolymerization rate of this sol is determined and the results are shown on FIG. 7, Curve I. Also, see FIG. 7, Curve D for the caustic depolymerization rate of Portion A of this sol prior to aging.

Portion A is aged at room temperature for 28 days and the following analyses are determined: $d_s$, 16.1 m$\mu$; $A_n$, 305 m.²/g. $S_t$ 681 m.²/g. Refer to FIG. 7, Curve G for the caustic depolymerization rate of this aged sol. Curve H of FIG. 7 shows the rate for the same sol after 40 days of aging.

EXAMPLE 5

Preparation of silicon metal 50 g. of through 40 mesh silicon metal ground in a manner described in Example 1 is activated as in Example 2.

Preparation of heel

The silica sol used in the heel for this batch contains 16% $SiO_2$ and has a surface area average diameter of the particles equal to 97.8 m$\mu$. This sol has been aged at room temperature and a pH of 9.4 for 70 days prior to its use in this batch. 446 g. of this sol is charged to the reactor. 925 ml. of aqueous reagent grade ammonium hydroxide are added to the silica sol and this heel cooled to 12° C. Then 147 g. of anhydrous ammonia is slowly added to the cooled heel. The reaction flask is then purged with nitrogen.

Reaction step

The 50 g. of activated silicon metal is added to the heel over a 1-hour period in a manner described in Example 1. The temperature of the reaction mixture is maintained between 25 and 30° C. and the hydrogen evolution rate varies between 0.68 and 1.0 l./min. Fifteen minutes after starting the addition of the silicon metal to the reaction mixture, the addition of 1390 ml. of ammonium hydroxide is started at a constant rate. The aqueous ammonium hydroxide is added at such a rate that all has been added in 45 minutes; thus the addition of silicon metal and additional ammonium hydroxide are completed at the same time. After completion of the above addition, the reaction mixture is allowed to agitate for 16 hours and is filtered to remove insoluble impurities and unreacted silicon metal as described in Example 1.

Concentration

A small portion of the filtered reaction mixture is placed in a 1-liter round-bottom flask equipped with an agitator and a sparger tube. This mixture was stripped with nitrogen for 10 hours in order to remove excess ammonia. After stripping this sample is deionized with "Dowex" 50W resin to a pH of 3.1 and the resin is separated from the silica sol by filtration.

Analysis

This ammonia-stripped and deionized silica sol has a specific gravity of 1.038 which is equivalent to 6.7% $SiO_2$. The pH is 3.1 at 25° C. $A_n$ is 325 m.$^2$/g. $d_s$, 122 m$\mu$. $S_t$, 695 m.$^2$/g. The caustic depolymerization rate of this sol is determined and is shown in FIG. 8, Curve K.

EXAMPLE 6

Preparation of silicon metal 195 g. of through 40 mesh fraction Si metal is activated in the manner described in Example 2.

Preparation of heel

The silica sol used in this heel is prepared by the method described by Rule U.S. Pat. 3,012,972. This silica sol contains 51.5% $SiO_2$ and the surface area average diameter of the particles is 56.9 m$\mu$. This sol has been stabilized with ammonium hydroxide and has a pH of 8.55 at 25° C. 65 g. of this sol is placed in the reactor described in Example 1 above and 1980 ml. of aqueous reagent grade ammonium hydroxide is added. The heel is then cooled to 10° C. and 25 g. of anhydrous ammonia is added slowly. The reactor is then purged with nitrogen.

Reaction step

The above heel is then heated to 25° C. by passing warm water through the reactor cooling bath and then the addition of activated silicon metal is started. The silicon metal is added over a 4-hour period as described in Example 1. Fifteen minutes after starting the addition of silicon metal, the addition of 6825 g. of ammonium hydroxide is started at a constant rate. The rate of addition of ammonium hydroxide is controlled so that it is completely added over a period of 225 minutes. Thus, the addition of silicon metal and ammonium hydroxide are completed at the same time. The temperature of the reaction mixture is maintained between 25° and 30° C. by external cooling. This reaction mixture is completed and filtered in the manner described in Example 1.

Concentration

The concentration of this batch is carried out in the manner described in Example 2 and yields 2028 g. of silica sol containing 18.5 $SiO_2$.

Analysis pH, 9.0 at 25° C. $A_n$, 374 m.$^2$/g. $d_s$, 155 m$\mu$. Total alkalinity as percent $NH_3$, 0.31. The shape of the caustic depolymerization curve of this sol is shown in FIG. 8, Curve L. Microtome sections of the dried powder are similar to those shown in FIG. 5.

EXAMPLE 7

Preparation of silicon metal 308 g. of through 40 mesh ground Si metal is activated in the manner described in Example 2.

Preparation of heel

The silica sol used as a heel in this batch is similar to the sol prepared in Example 1. This sol contains 20.0% $SiO_2$ and has a surface area average diameter ($d_s$) of 214 m$\mu$. 363 g. of this freshly prepared sol is placed in a 22 liter reactor equipped as described in Example 1. 1383 g. of reagent grade aqueous ammonium hydroxide is added to the reactor and the contents cooled to 10° C. 134 g. of anhydrous ammonia is then added slowly. The reactor is purged with nitrogen.

Reaction step

The above heel is heated to 25° C. by passing warm water through the reactor cooling bath and the addition of silicon metal is started. The 308 g. of activated metal is added in the manner described in Example 1. However, the reaction period is extended to 6.5 hours. Fifteen minutes after starting the addition of silicon metal, the addition of 12,520 g. of reagent grade ammonium hydroxide is started at a constant rate so that this material is added over a 6.25 hour period.

The temperature of the reaction mixture is maintained between 25 and 30° C. by external cooling. After the conclusion of the addition of silicon metal and ammonium hydroxide, the batch is finished in the same manner as described in Example 1.

Concentration

In this batch the concentration is carried out in a 5 liter vessel and the constant volume evaporation at a level of approximately 4000 ml. The evaporation proceeds essentially as described in Example 2 with the temperature of the boiling silica sol being maintained between 24° and 30° C. After all of the reaction mixture has been fed to the concentrator, the silica sol is boiled down to approximately 3000 ml. This yields approximately 3330 g. of a silica sol. The $d_s$ for this sol is approximately 450 m$\mu$.

EXAMPLE 8

Preparation of silicon metal

The silicon metal used in this batch contains 97.82% Si, 0.01% Ca, 0.38% Al, and 1.14% Fe. 184 g. of through 40 mesh ground metal is activated in the manner described in Example 2.

Preparation of heel

The silica sol used in this batch is prepared by the process described in Alexander U.S. Pat. 2,750,345. This sol contains 15% $SiO_2$ and has a surface area average diameter ($d_s$) of 7 m$\mu$. 206 g. of this sol is placed in the 22-liter reactor described in Example 7. 16,320 ml. of reagent grade aqueous ammonium hydroxide is added to the reactor and the contents cooled to 10° C. 76 of anhydrous ammonia are then added slowly.

Reaction step

The above heel is heated to 25° C. by passing warm water through the reactor cooling bath. The 184 g. of activated silicon metal is added over a 4-hour period as described in Example 1. No additional ammonium hydroxide is added during the reaction period. The reaction temperature is maintained between 25° and 29° C. After completion of the addition of silicon metal, this batch is completed in the manner described in Example 1.

This batch is concentrated in the manner described in Example 2 and yields approximately 1930 g. of silica sol.

The shape of the caustic depolymerization curve for this sol is similar to the shape of Curve L in FIG. 8, showing that the particles are composed of a dense spherical silica core surrounded by a porous silica coating.

EXAMPLE 9

804 g. of commercial 8 mesh and down silicon metal is placed in 1.1 liter. 4" inside diameter, batch sand grinder equipped with two nylon discs 3" outside diameter mounted on the shaft. The sand grinding media is removed from the mill prior to charging the above silicon metal. Thus, the silicon metal silicon metal is used both as a reactant and as the grinding media. Mills of this type are described in Hochberg U.S. Pat. 2,581,414.

Preparation of heel

The silica sol used in the heel for this batch contains 16.9% SiO$_2$ and has a surface area average diameter of about 10 m$\mu$. This sol has been aged at room temperature at a pH of 8.8 for 130 days prior to its use in this batch. 15.6 g. of this sol are added to 330 ml. of aqueous reagent grade ammonium hydroxide and well mixed.

Reaction step

The grinder and its charge of silicon metal is purged with nitrogen. Cooling water is passed through the jacket of the mill at 19° C. As soon as the heel prepared above is added to the grinder, rotation of its shaft at 1700 r.p.m. is started. Milling and reaction are allowed to continue for 30 minutes. The reaction mixture is immediately filtered and the large excess of silicon metal is washed with water on the filter.

This dilute sol is concentrated in the manner described in the previous examples to volume of about 200 ml. The concentrated sol contains 7% SiO$_2$ and the $d_s$ for this sol is approximately 20 m$\mu$.

In the following claims the symbol $d_s$ is the surface area average diameter, $S_c$ is the external specific surface area in m.$^2$/g. as determined by the equation, $$S_c = \frac{6 \times 10^3}{\text{density} \times d_s}$$

$S_t$ is the specific surface area in m.$^2$/g. as determined by sodium hydroxide titration and A$_n$ is the specific surface area in m.$^2$/g. by nitrogen adsorption. These terms have been previously defined in the specification.

I claim:
1. A process for building up the size of particles in an aqueous silica sol which comprises: providing a heel of the sol containing aqueous ammonium hydroxide; the concentration of silica in the heel prior to starting addition of silicon metal is determined in accordance with the equation:

$$W = K \cdot \left(\frac{B}{S_c \cdot C}\right)$$

where W is the silica concentration in the heel in weight percent on the NH$_4$OH-free basis and has a value between about 5 and 20; $S_c$ is the external specific surface area of the colloidal silica particles in the heel sol in m.$^2$/g. and has a value between about 17 and 900; C is the weight in grams of the reaction mixture prior to starting the addition of silicon metal; B is the production rate of silica in the reaction mixture in g./min., and K is a factor between about 1$\times$10$^4$ and 1$\times$10$^9$; the ammonia concentration in the reaction mixture prior to starting addition of silicon metal is between about 5 and 35% by weight; gradually introducing active silicon metal in the form of granules between about 0.5 and 10 microns in diameter into the heel at a rate between about 10$^{-5}$ and 10$^{-3}$ grams per minute per gram of reaction mixture; permitting the metal and water to react in the presence of the ammonia to form silica; the ammonia concentration is maintained in said range throughout the addition of metal by refluxing ammonia to the reaction vessel or by adding additional ammonia, or both; and the concentration and surface area of silica in the heel and the production rate of silica in the reaction mixture being such that the silica formed polymerizes on the heel particles present.

2. The process of claim 1 wherein the heel sol is made up of particles selected from the group consisting of dense silica particles, porous silica particles, and porous silica particles having a relatively dense outer layer which is impervious to N$_2$ molecules.

3. A silica aquasol consisting essentially of water, ammonia to provide a pH above 9, and 5 to 60% by weight of spherical silica particles having a $d_s$ between 15 and 500 m$\mu$, the particles being composed of a spherical porous silica core bounded by a layer of relatively dense silica and an outer layer of a porous silica coating, the particles exhibit a ratio of $S_t$ to $S_c$ greater than 1+0.1 ($d_s$–5), the particles exhibit a ratio of A$_n$ to $S_t$ between 0.4+1.7 1/$d_s$–5 and 1, wherein $d_s$ is the surface area average diameter, $S_c$ is the external specific surface area in m.$^2$/g. as determined by the equation, $$S_c = \frac{6 \times 10^3}{\text{density} \times d_s}$$

$S_t$ is the specific surface area in m.$^2$/g. as determined by sodium hydroxide titration and A$_n$ is the specific surface area in m.$^2$/g. by nitrogen adsorption.

4. A dry colloidal silica powder consisting essentially of spherical silica particles having a $d_s$ between 15 and 500 m$\mu$ the particles being composed of a spherical porous silica core bounded by a layer of relatively dense silica and an outer layer of a porous silica coating, the particles exhibit a ratio of $S_t$ to $S_c$ greater than 1+0.1 ($d_s$–5), the particles exhibit a ratio of A$_n$ to $S_t$ between 0.4+1.7 1/$d_s$–5 and 1; wherein $d_s$ is the surface area average diameter, $S_c$ is the external specific surface area in m.$^2$/g. as determined by the equation, $$S_c = \frac{6 \times 10^3}{\text{density} \times d_s}$$

$S_t$ is the specific surface area in m.$^2$/g. as determined by sodium hydroxide titration and A$_n$ is the specific surface area in m.$^2$/g. by nitrogen adsorption.

5. The silica aquasol of claim 3 having an alkali metal content of less than 100 parts by weight per million parts of silica.

6. The silica powder of claim 4 having an alkali metal content of less than 100 parts by weight per million parts of silica.

7. The silica aquasol of claim 3 wherein the particles have a dense outer layer over said porous outer layer and exhibit a ratio of $S_t$ to A$_n$ greater than 1+0.08 ($d_s$–5).

8. The silica powder of claim 4 wherein the particles have a dense outer layer over said porous outer layer and exhibit a ratio of $S_t$ to A$_n$ greater than 1+0.08 ($d_s$–5).

9. A silica aquasol consisting essentially of water, ammonia to provide a pH above 9, and 5 to 60% by weight of spherical silica particles having a $d_s$ between 15 and 500 m$\mu$, the particles being composed of a dense silica sphere surrounded by a porous silica coating, the particles exhibit a ratio of $S_t$ to $S_c$ greater than $1 + 0.1 \ (d_s - 5)$, and the particles exhibit a ratio of $A_n$ to $S_t$ between $0.4 + 1.7 \ 1/d_s - 5$ and 1, wherein $d_s$ is the surface area average diameter, $S_c$ is the external specific surface area in m.²/g. as determined by the equation, $$S_c = \frac{6 \times 10^3}{\text{density} \times d_s}$$

$S_t$ is the specific surface area in m.²/g. as determined by sodium hydroxide titration and $A_n$ is the specific surface area in m.²/g. by nitrogen adsorption.

10. A dry colloidal silica powder consisting essentially of spherical silica particles having a $d_s$ between 15 and 500 m$\mu$, the particles being composed of a dense silica sphere surrounded by a porous silica coating, the particles exhibit a ratio of $S_t$ to $S_c$ greater than $1 + 0.1 \ (d_s - 5)$, and the particles exhibit a ratio of $A_n$ to $S_t$ between $0.4 + 1.7 \ 1/d_s - 5$ and 1, wherein $d_s$ is the surface area average diameter, $S_c$ is the external specific surface area in m.²/g. as determined by the equation, $$S_c = \frac{6 \times 10^3}{\text{density} \times d_s}$$

$S_t$ is the specific surface area in m.²/g. as determined by sodium hydroxide titration and $A_n$ is the specific surface area in m.²/g. by nitrogen adsorption.

11. A silica aquasol as defined in claim 9 wherein the particles have a dense outer layer and exhibit a ratio of $S_t$ to $A_n$ greater than $1 + 0.08 \ (d_s - 5)$.

12. A silica powder as defined in claim 10 wherein the particles have a dense outer layer and exhibit a ratio of $S_t$ to $A_n$ greater than $1 + 0.08 \ (d_s - 5)$.

References Cited

UNITED STATES PATENTS

| | | | |
|---|---|---|---|
| 2,574,902 | 11/1951 | Bechtold et al. | 252—313 |
| 2,577,485 | 12/1951 | Rule | 252—313 |
| 2,614,993 | 10/1952 | Montenyohl et al. | 252—313 |
| 2,900,348 | 8/1959 | Ahlberg et al. | 252—313 |

RICHARD D. LOVERING, Primary Examiner

U.S. Cl. X.R.

23—182; 106—69; 117—100